United States Patent
Pradel et al.

(10) Patent No.: US 7,156,214 B2
(45) Date of Patent: Jan. 2, 2007

(54) VIBRATION DAMPER WITH AMPLITUDE-SELECTIVE DAMPING FORCE

(75) Inventors: Robert Pradel, Röthlein (DE); Helmut Baalmann, Bergrheinfeld (DE)

(73) Assignee: ZF Sacha AG, Schweinfurt (DE)

( * ) Notice: Subject to any disclaimer, the term of this patent is extended or adjusted under 35 U.S.C. 154(b) by 246 days.

(21) Appl. No.: 10/820,402

(22) Filed: Apr. 8, 2004

(65) Prior Publication Data

US 2004/0200946 A1    Oct. 14, 2004

(30) Foreign Application Priority Data

Apr. 12, 2003 (DE) .................. 103 16 957

(51) Int. Cl.
F16F 9/44 (2006.01)
(52) U.S. Cl. .................. 188/319.1; 188/300; 188/314; 267/64.12; 267/65.12; 267/64.26; 248/560; 248/566
(58) Field of Classification Search ............ 188/319, 188/300, 314, 313, 316, 317, 322.22, 281, 188/322.15; 267/64.12, 64.15, 64.26; 248/560, 248/566
See application file for complete search history.

(56) References Cited

U.S. PATENT DOCUMENTS

| | | |
|---|---|---|
| 4,723,640 A | 2/1988 | Beck |
| 4,854,429 A | 8/1989 | Casey |
| 5,058,715 A | 10/1991 | Silberstein |
| 6,220,409 B1 | 4/2001 | Deferme |
| 6,296,089 B1 * | 10/2001 | Koch et al. .................. 188/300 |
| 6,352,145 B1 | 3/2002 | DeMolina et al. |
| 6,460,663 B1 * | 10/2002 | Huang ..................... 188/282.4 |
| 6,634,465 B1 * | 10/2003 | Tuschen ................ 188/1.11 L |
| 7,017,928 B1 * | 3/2006 | Felsl et al. ................... 280/276 |

FOREIGN PATENT DOCUMENTS

| | | |
|---|---|---|
| DE | 40 02 882 | 2/1991 |
| DE | 195 47 910 | 1/1997 |
| DE | 100 47 878 | 11/2001 |
| EP | 1 152 166 | 11/2001 |
| GB | 2 234 041 | 1/1991 |

OTHER PUBLICATIONS

Search Report for the corresponding French dated Sep. 26, 2005.

* cited by examiner

*Primary Examiner*—Amy J. Sterling
(74) *Attorney, Agent, or Firm*—Cohen, Pontani, Lieberman & Pavane

(57) ABSTRACT

Vibration damper includes a cylinder filled with a damping medium in which a piston rod with a piston is guided in an axially movable manner, wherein the piston divides the cylinder into a work space on the piston rod side and a work space remote of the piston rod. A bypass connects at least one of the two work spaces with a first work chamber in a housing in which an axially movable separating piston separates the first work chamber from a second work chamber, the bypass being controlled by a switchable valve.

15 Claims, 2 Drawing Sheets

VIBRATION DAMPER WITH AMPLITUDE-SELECTIVE DAMPING FORCE

BACKGROUND OF THE INVENTION

1. Field of the Invention

The invention is directed to a vibration damper with amplitude-selective damping force including a cylinder filled with damping medium; a piston rod guided in the cylinder in an axially movable manner, the piston rod carrying a piston which divides the cylinder into a work space on the piston rod side and a work space remote from the piston rod; and a housing which is axially movable in one of the work spaces, the housing containing an axially movable separating piston which separates the housing into a first work chamber and a second work chamber.

2. Description of the Related Art

In vibration dampers operating in an amplitude-selective manner such as are known, for example, from U.S. Pat. No. 6,220,409, DE 40 02 882 C1, U.S. Pat. No. 6,352,145 and EP 1 152 166 A1, at least one work space of the vibration damper is connected to a housing in which a separating piston is displaceable axially within limits between two work chambers inside the housing. Because of the displacement path of the separating piston, only a very slight damping force is generated during a movement of the piston rod in which the displaced volume of one of the work chambers is displaced by a choke between the work chamber and a work space. The purpose of this step is precisely to filter out high-frequency excitations with small amplitudes so that greater driving comfort is achieved overall. In some cases, sporty drivers will miss a certain directness in the chassis in fast steering movements because, besides the stabilizer, the damping forces of the vibration damper also determine the roll or side tilt of the vehicle body.

SUMMARY OF THE INVENTION

According to the invention, the problems associated with the prior art are met by controlling the bypass with a switchable valve.

The advantage consists in that amplitude-selective damping can now be used without restricting chassis response. Through a corresponding sensing of the driving situation, the amplitude-selective damping can be used to ensure a high degree of driving comfort on the one hand and a high level of driving safety on the other hand.

In another advantageous construction, the valve in the bypass can be controlled continuously. The damping force can therefore be deliberately adjusted in the operative range of the amplitude-selective damping.

According to a further innovation, at least one of the work spaces is connected to an adjustable damping valve. Various constructions of adjustable damping valves have already existed for a long time. In order to achieve a high degree of driving comfort also with high-frequency excitations, the response of the sensors for determining the driving situation must be correspondingly fast. However, sensors of this kind are comparatively expensive. Further, there is, in addition, the internal regulating time in the chassis system, so that the time for readjusting the damping force reaches its limits. By combining an adjustable damping valve with an amplitude-selective damping device, the high-frequency excitations are practically filtered out, so that longer overall regulating times with simpler sensors are permissible.

In another advantageous construction, the adjustable damping valve and the switchable valve for the bypass are switched by a common actuator. In principle, a separate actuator can be provided for the adjustable damping valve and an actuator can be provided for the switchable valve in the bypass. However, magnetically operated actuators in particular are comparatively expensive. Therefore, it is desirable to influence both valves by a common actuator.

It is also possible in principle to connect the adjustable damping valve to the bypass for the amplitude-selective damping device. A general problem may be posed by the installation space available in or on the vibration damper. Therefore, the axially movable separating piston in the housing is outfitted with at least one damping valve. The damping valve and the amplitude-selective damping device are therefore functionally combined to a great extent.

The adjustable damping valve is fastened to the piston rod according to an advantageous embodiment.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
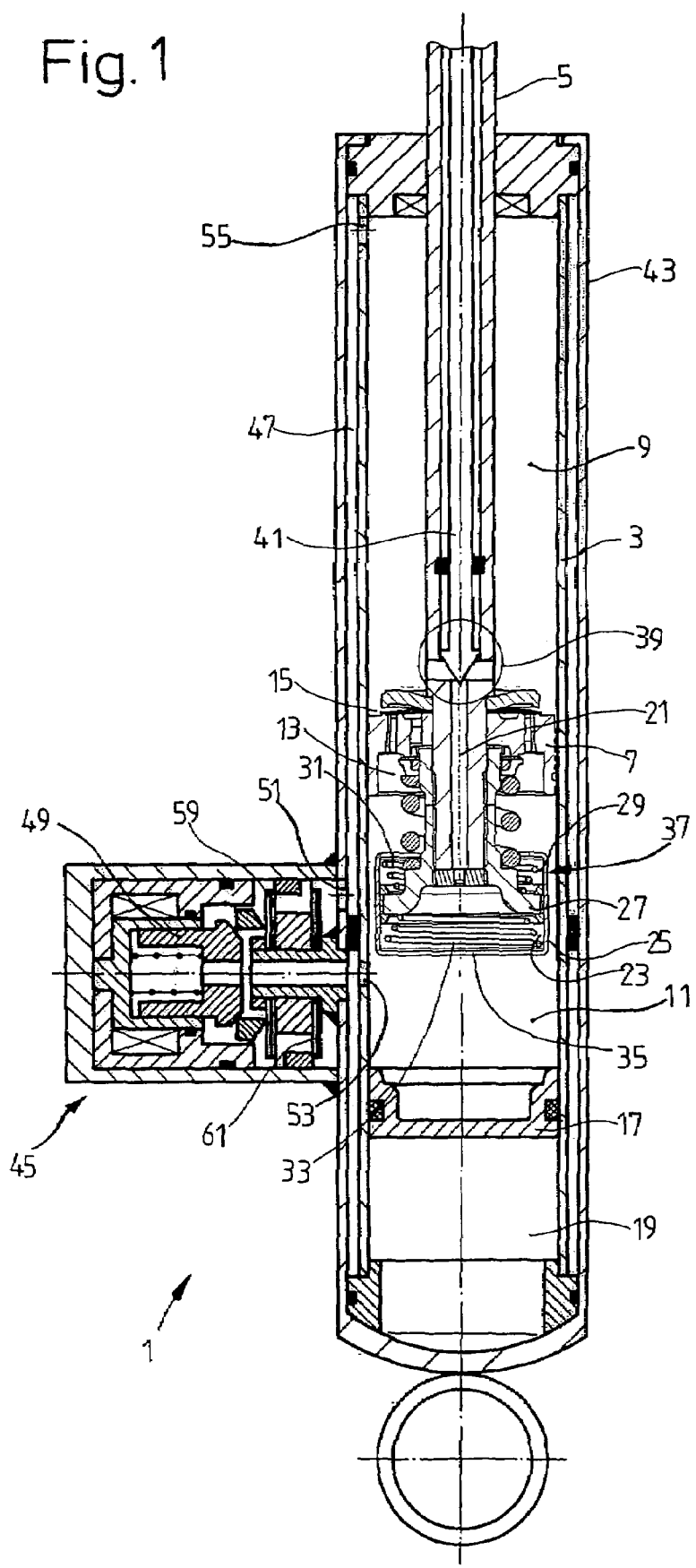
FIG. 1 shows a switchable damping valve in a bypass and a separately adjustable damping valve.

FIG. 1 shows a vibration damper 1. A piston rod 5 with a piston 7 is guided so as to be axially movable in the cylinder 3 of the vibration damper 1, this cylinder 3 being filled with damping medium. The piston divides the cylinder into a work space 9 on the piston rod side and a work space 11 remote of the piston rod. A damping valve 13, 15 is constructed in the piston for the rebound direction and for the compression direction, respectively. A separating piston 17 for a compensating space 19 filled with gas adjoins the work space remote of the piston rod.

A bypass 21 is constructed inside the piston rod 5 proceeding from the work space 9 on the piston rod side and connects this work space 9 with a first work chamber 23 which is constructed in a housing 25 at the piston rod. The piston rod carries a separating piston 27 which separates the first work chamber from a second work chamber 29 in the housing 25. The housing 25 is supported by two springs 31; 33 at the separating piston so as to be movable axial thereto. The first work chamber 23 is separated from the work space 11 remote of the piston rod by a closed bottom 35 of the housing 25. The housing, the separating piston 27 with the two springs, and the bypass form an amplitude-selective damping device 37.

A switchable valve 39 is arranged inside the bypass; only an axially displaceable valve body is shown as part of an actuator 41 of the switchable valve. The actuator can be operated by magnetic force but also hydraulically, pneumatically or by means of any other introduced force. In principle, the switchable valve 39 can be constructed as a simple closing valve with open and closed switching positions or as a proportional valve which can also occupy any intermediate positions.

An outer tube 43 to which an adjustable damping valve 45 is flanged is arranged concentric to the cylinder. The outer tube and the cylinder respectively determine a fluid connection 47 from one of the two work spaces 9, 11 to the adjustable damping valve 45. The adjustable damping valve has, for example, a magnetically operated actuator 49, but as with the switchable valve for the bypass any other controlling forces are also possible and reasonable. There is an alternating flow through the adjustable damping valve via connection openings 51; 53 depending upon the piston rod.

As the piston rod slowly moves out, the volume in the work space 9 on the piston rod side is compressed. Assuming a noncritical driving situation, the switchable valve 39 in the bypass 21 is open. Before a significant volume flows through the damping valve 13 in the piston or the adjustable damping valve 45, the housing 25 displaces against the spring 31 in the direction of the work space 11 remote of the piston rod with respect to the separating piston. As soon as the end position of the housing 25 at the separating piston is reached, the damping medium is displaced to the adjustable damping valve 45 through a fluid opening 55 in the work space 9 on the piston rod side below a piston rod guide. The switching position of the switchable damping valve 39 is not important after this operating state. Depending on the switching position of the adjustable damping valve 45, damping medium flows through the damping valve in the piston and via the connection opening 51 through the adjustable damping valve 45. A valve body 57 with valve disks 59 for the extending direction and valve disks 61 for the retracting direction is arranged in the adjustable damping valve.

When the piston rod 5 moves in the direction of the work space 11 remote of the piston rod, this work space 11 is compressed so that an axial displacing movement with respect to the separating piston 27 is exerted on the bottom 35 of the housing 25 of the amplitude-selective damping device 37. When the switchable valve 39 in the bypass 21 is opened, the volume displaced from the first work chamber 23 in the housing is displaced through the bypass 21 into the work space 9 on the piston rod side. When the housing reaches its end position in the direction of the separating piston, that is, when the first work chamber is at a minimum, the damping medium flows through the piston 7 and/or through the adjustable damping valve 45, and the compensating space 9 compensates the volume of the retracting and extending piston rod 5.

Regardless of the movement direction of the piston rod, an individual damping of the volume displaced from the first work chamber can be achieved through an intermediate position of the continuously adjustable valve 39 in the bypass 21. In this way, a substantial influence can be exerted on the total damping characteristic of the vibration damper.

Figure 2:
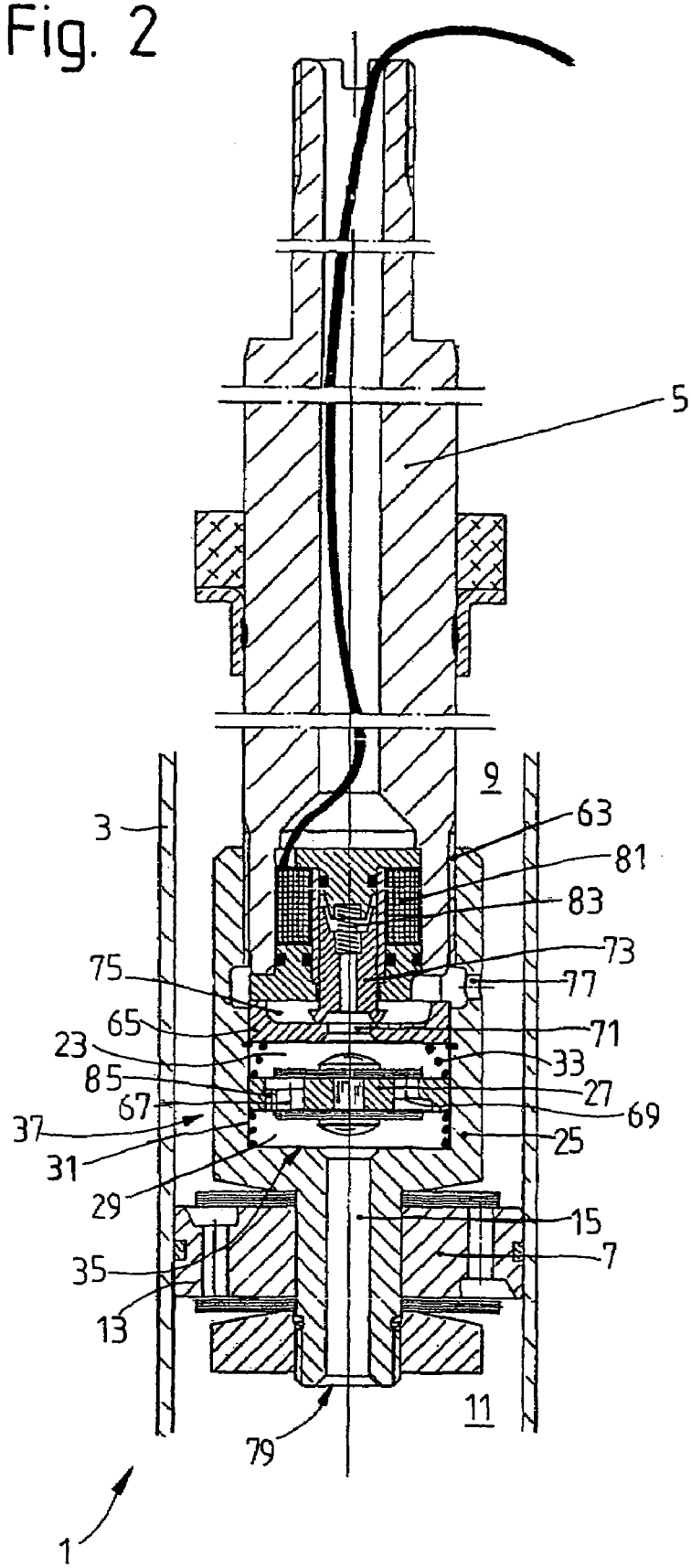
FIG. 2 shows a combined amplitude-selective damping device and adjustable damping valve.

Another constructional variant is shown in FIG. 2. Above the piston 7 which separates the work space 9 on the piston rod side from the work space 11 remote of the piston rod, the housing 25 is fastened to the piston rod 5 via a connection thread 63. Between a housing cover 65 and the bottom 35 of the housing, the separating piston 27 of the amplitude-selective damping device is tensioned in an axially movable manner between two springs 31; 33 in the same way as in FIG. 1. The separating piston has a pull stage valve or rebound valve 67 and a push stage valve or compression valve 69. A valve opening 71 is constructed in the housing cover, the upper side of the housing cover 65 forming a valve seat surface for an axially movable valve body 73. The housing cover separates the first work chamber 23 in the housing 25 from a collecting space 75 which has at least one fluid opening 77 to the work space 9 on the piston rod side. A fluid opening 79 to the second work chamber 29 is also constructed in the base or bottom 35 of the housing. The flow path between the fluid openings 77; 79 through the valve opening 71 in the housing cover 65, the two work chambers 23; 29 and the damping valves 67; 69 in the separating piston 27 forms the bypass to the damping valves 13; 15 in the piston 7.

The valve body 73 in connection with a coil 81 and a restoring spring 83 forms the magnetically actuated actuator.

The separating piston 27 inside the housing 25, with the exception of a pre-opening 85 which may possibly be used, may be considered as closed until the valve disks of the damping valve in the separating piston have been lifted.

When the piston rod 5 moves in the direction of the work space 9 on the piston rod side, the damping medium can flow through the fluid opening 77 into the collecting space 75. When a valve body 73 is lifted, the damping medium can flow through the valve opening 71 into the first work chamber 23 and axially displace the separating piston 27 in the direction of the second work chamber 29 in the housing. As soon as the end of the stroke of the separating piston is reached, the rebound valve 67 in the separating piston opens depending on the piston rod speed. The damping force is then determined from the superimposed damping action of the rebound valve 13 in the piston 7 and in the separating piston 27.

When the piston rod 5 is moved in the direction of the work space 11 remote of the piston rod, the reverse flow path is available in the bypass, and the separating piston 27 in the housing is displaced in the direction of the housing cover 65. In so doing, the damping forces of the compression valves 15; 63 in the separating piston 17 and in the piston 7 are superimposed.

The essential difference with respect to the variant according to FIG. 1 is that when the valve in the bypass is closed, i.e., when the valve body 73 sits on the valve seat of the housing cover 65, the action of the amplitude-selective damping device 37 with the displaceable separating piston as well as the rebound and compression damping valves in the separating piston is canceled. The hardest damping force is also applied then because all of the damping medium is displaced from the work space remote of the piston rod through the damping valves in the piston. Spatially and functionally, the adjustable damping valve and the switchable valve for the bypass are then switched by a common actuator; also, a unit exists spatially. This combination of separate valves is based on the idea that a harder damping force tends to be desired when an amplitude-selective damping device 37 is switched off or, when the damping force characteristic is soft, an amplitude-selective damping device is also to be switched on. The great advantage lies in the advantageous use of construction space and structural component parts, particularly limiting to a single actuator.

Generally, the function of the adjustable damping valve can also be dispensed with in the variants shown herein when the external damping valve 45 in FIG. 1 is not used or the damping valves 67, 69, 85 in FIG. 2 are not used and a completely closed separating piston is used instead.

On the other hand, it is certainly also meaningful to use amplitude-selective damping in connection with an adjustable damping valve 45 without the bypass to the amplitude-selective damping device being switchable by means of a valve.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A vibration damper comprising:
   a cylinder filled with damping medium;
   a piston rod guided in the cylinder in an axially movable manner, the piston rod carrying a first piston which divides the cylinder into a work space on the piston rod side and a work space remote from the piston rod;
   at least one damping valve arranged in the first piston and connecting the work space on the piston rod side to the work space remote from the piston rod; and
   an amplitude-selective damping device providing damping separately from the at least one damping valve and comprising a housing which is axially movable in one of the work spaces, a second axially movable separating piston contained in the housing and separating the housing into a first work chamber and a second work chamber, and a bypass connecting at least one of the work spaces to the first work chamber; and
   a switchable valve controlling the bypass.

2. A vibration damper as in claim 1 wherein the switchable valve is controllable continuously.

3. A vibration damper as in claim 1 further comprising an additional adjustable damping valve connected to at least one of the work spaces.

4. A vibration damper as in claim 3 further comprising a common actuator for switching both the adjustable damping valve and the switchable valve.

5. A vibration damper as in claim 3 wherein the adjustable damping valve is fastened to the piston rod.

6. A vibration damper as in claim 1 wherein the housing is axially movable relative to the piston rod.

7. A vibration damper as in claim 3 further comprising an outer tube arranged concentric to the cylinder, the adjustable damping valve being flanged to the outer tube and being connected to the work space on the piston rod side via a fluid connection arranged between the outer tube and the cylinder and a first connection opening in the cylinder.

8. A vibration damper as in claim 7 wherein the adjustable damping valve is connected to the work space remote from the piston rod via a second connection opening in the cylinder.

9. A vibration damper as in claim 1 wherein the bypass is arranged inside the piston rod.

10. A vibration damper as in claim 1 further comprising an actuator for selectively switching the switchable valve, the actuator being operated by a freely triggerable magnetic, hydraulic, or pneumatic force.

11. A vibration damper as in claim 1 wherein the amplitude-selective damping device further comprises support springs for the second separating piston in the first and second work chambers.

12. A vibration damper as in claim 1 wherein the housing is fastened to the piston rod.

13. A vibration damper as in claim 1 wherein the second separating piston comprises at least one damping valve.

14. A vibration damper as in claim 1 wherein the housing comprises a housing cover having a valve opening and forming a valve seat surface for an axially movable valve body, the valve opening connecting the first work chamber in the housing to a collecting space which has at least one fluid opening to the work space on the piston rod side.

15. A vibration damper as in claim 14 wherein the housing comprises a housing bottom having a fluid opening connecting the second work chamber in the housing to the work space remote from the piston rod.

* * * * *

UNITED STATES PATENT AND TRADEMARK OFFICE
CERTIFICATE OF CORRECTION

| | | |
|---|---|---|
| PATENT NO. | : 7,156,214 B2 | Page 1 of 1 |
| APPLICATION NO. | : 10/820402 | |
| DATED | : January 2, 2007 | |
| INVENTOR(S) | : Robert Pradel | |

It is certified that error appears in the above-identified patent and that said Letters Patent is hereby corrected as shown below:

Please replace the listing of the Assignee on the title page of the above-identified patent with the following:

--(73)    Assignee:    ZF Sachs AG, Schweinfurt (DE)--

Signed and Sealed this

Tenth Day of April, 2007

JON W. DUDAS
*Director of the United States Patent and Trademark Office*